E. SEIBERT.
BINDER REEL.
APPLICATION FILED AUG. 21, 1909.

981,319.

Patented Jan. 10, 1911.

3 SHEETS—SHEET 1.

Witnesses.
Wm. J. Jordan
R. Haftel

Inventor:
E. Seibert
by Egerton K. Case
Atty.

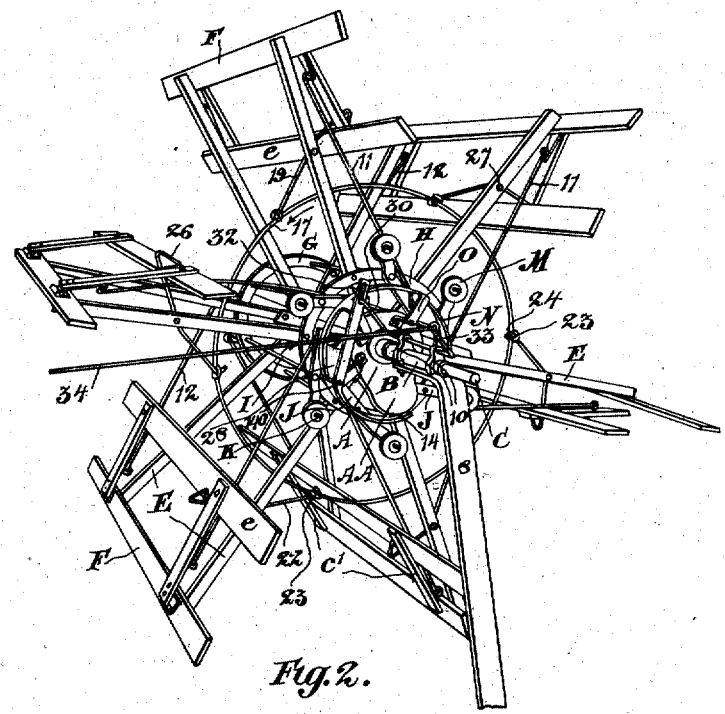
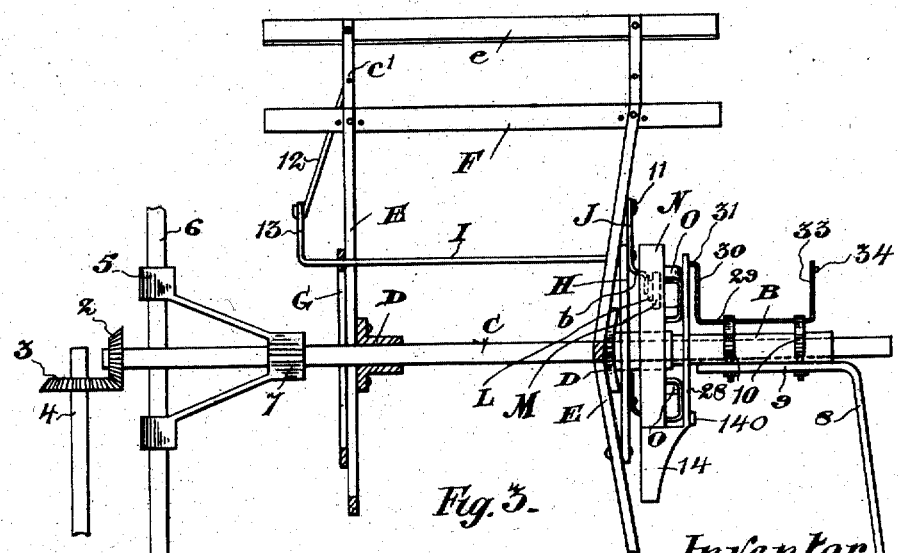

E. SEIBERT.
BINDER REEL.
APPLICATION FILED AUG. 21, 1909.

981,319.

Patented Jan. 10, 1911.
3 SHEETS—SHEET 3.

Witnesses.
Wm. S. Jordan
R. Haftel

Inventor
E. Seibert
by Gutm R. Case
Atty.

UNITED STATES PATENT OFFICE.

ENOCH SEIBERT, OF DIDSBURY, ALBERTA, CANADA.

BINDER-REEL.

981,319.     Specification of Letters Patent.     Patented Jan. 10, 1911.

Application filed August 21, 1909. Serial No. 514,064.

*To all whom it may concern:*

Be it known that I, ENOCH SEIBERT, a subject of the King of Great Britain, residing at Didsbury, in the Province of Alberta, Canada, have invented certain new and useful Improvements in Binder-Reels, of which the following is a specification.

My invention relates to improvements in binder-reels, and the object of my invention is to design a reel of the class described by means of which I can pick up fallen or lodged grain and feed it to the cutter-bar, as the mower machine is drawn along, and the construction of my preferred form of invention will be hereinafter particularly described, and the parts I claim as new will be set forth in the claims forming part of this specification.

Figure 1:
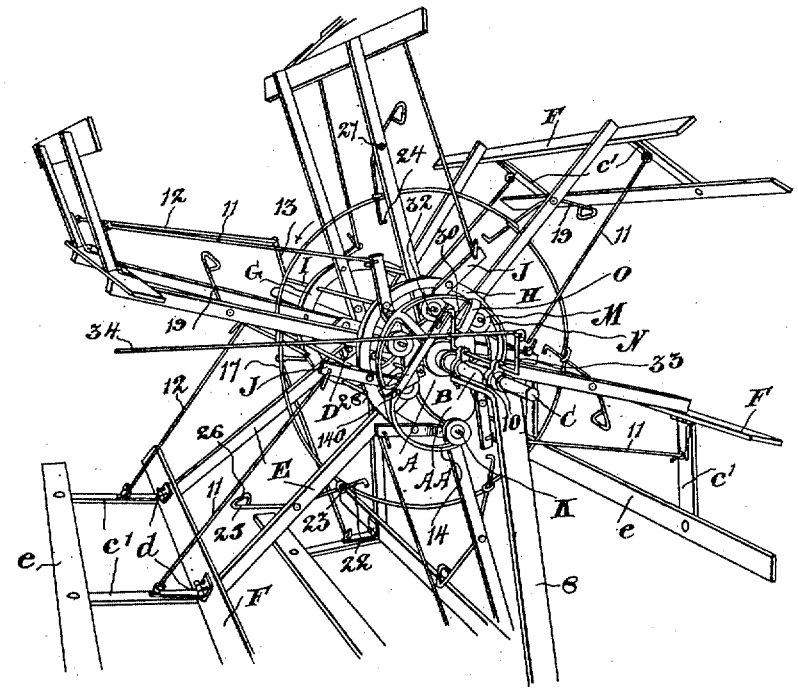
Figure 5:
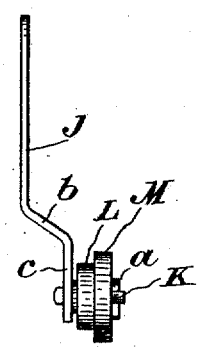
Figure 6:
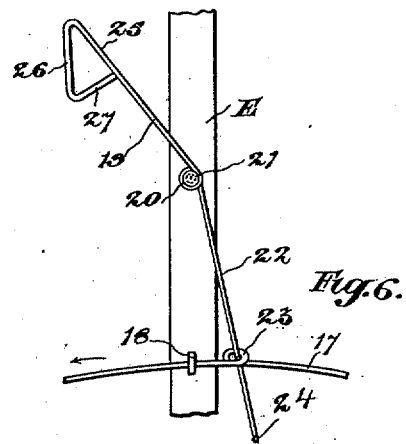
Figure 4:
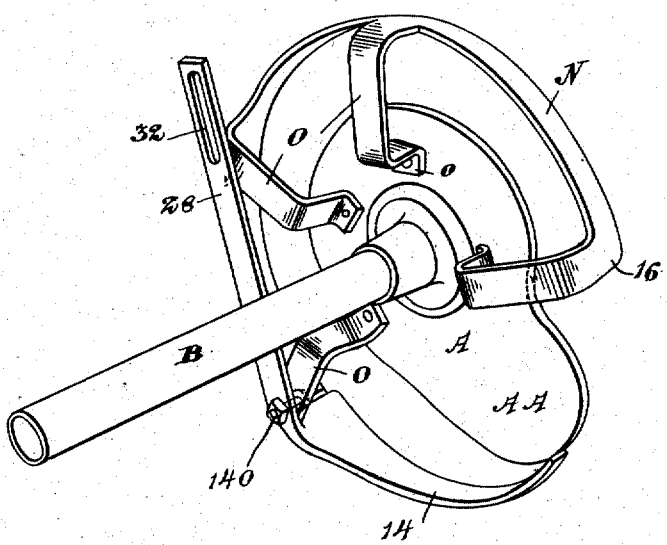

Figure 1 is a perspective view of my binder-reel showing the same in operative position to pick up lodged or fallen grain, and feed it to the cutter-bar. Fig. 2 is a perspective view of my binder-reel showing the same in operative position to feed upright grain to the cutter-bar. Fig. 3 is an enlarged detail view, partly in section, showing a side elevation of portion of parts of my binder-reel. Fig. 4 is a perspective view, on an enlarged scale, of the cam-member used with my binder-reel. Fig. 5 is an edge view of the rollers used in my binder-reel, together with supporting-arm therefor, and Fig. 6 is a side view of one of the members swung on one of the reel-arms and used to latch the swinging portions of the reel arms in folded position thereagainst.

In the drawings, like characters of reference indicate corresponding parts in each figure.

The reel-head comprises a cam A keyed to a sleeve B, and this sleeve, together with the said cam, is mounted on the reel-shaft C.

D are the usual spiders keyed to the reel shaft C, and to which are secured the reel-arms E. F are the usual cross-bars carried by the said reel-arms.

G and H are ring plates secured to the reel-arms at the tail end and head, respectively, of the reel.

I are rock-bars journaled in the ring-plates G and H, and projecting therebeyond. Keyed to the outer ends of the rock-bars I are a plurality of supporting-arms J, in the free ends of which are journaled, by the pins K, a pair of rollers L and M, the inner roller being of lesser diameter than the outer. These rollers are retained on the pins K by means of the split pins $a$, only illustrated in Fig. 5.

Carried by the cam A, is a cam-track N which substantially overhangs the perimeter of the cam A.

The supporting-arms J are provided with an off-set portion $b$, and the lower portion $c$ of these supporting-arms is substantially parallel with the upper portion thereof.

It will be seen upon referring to Fig. 3 that the ring plate H is spaced apart from the cam-track N and therefore the off-set portion $b$ of the supporting-arms is essential so as to position the rollers L and M, the first-mentioned roller in relation to the perimeter of the cam A, and the second-mentioned roller in relation to the cam-track N. To allow for the movement of the said rollers in relation to the cam A and the cam-track N, I support the said cam-track on the said cam by means of a plurality of substantially U-shaped arms O, the inner ends $o$, of which are formed parallel to the surface of the cam A, and suitably secured thereto. By means of these U-shaped arms O it will be understood that the rollers L and M will have a free path and movement.

Any suitable means may be employed to drive the reel shaft C. The construction shown for this purpose consists of a bevel wheel 2 keyed to the inner end of the reel shaft C. This bevel wheel 2 is in mesh with the bevel wheel 3 having sliding movement on the driven-bar 4.

5 is any suitable bracket carried by the upright 6, and in the head 7 of this bracket, the reel shaft C has bearing.

As before mentioned, the shaft C passes through the sleeve B, and by means of the standard 8 (supported from the platform, not shown), on the head 9 of which rests the sleeve B, the outer end of the shaft C is held in place.

10 are metal straps passing over the sleeve B and securing it to the head 9 of the standard 8.

In the position of the parts shown in Fig. 1, the hinged extensions of the reel (which comprise the bars $c^1$ suitably hinged as by hinges $d$ to the cross-bars F, and carrying at their outer ends cross-bars $e$) are operating to pick up the lodged or fallen grain and feed it to the cutter-bar (not shown). When the hinged extensions of the reel occupy such a position that they will have a tendency to move outward around their hinges, it will be understood that as these hinged extensions are connected by rods 11 and 12 to the outer ends of supporting arms J, and the turned ends 13 of the rock-bars I, respectively, the weight of these hinged extensions will keep the rollers L in contact with the perimeter of the cam A. Now the configuration of this cam is such that when the rollers L and M, and their supporting-arms J, are in the position shown in Fig. 1, the hinged extensions of the reel will be swung inwardly toward the reel-arms so that the cross-bars e will pass beneath the lodged or fallen grain and raise it up sufficiently so as to feed it to the cutter-bar. Upon referring to the drawings, particularly Fig. 4, it will be seen that as the roller L passes around the extension A A of the cam A, the supporting arms J will be tilted into the position shown in Fig. 1 by the lowermost supporting-arm, thus moving inward the rods 11 and 12 and so moving the hinged extensions into a position more or less at right angles to the reel-arms E. As these rollers pass by the extension A A and toward the upper part of the cam A, it will be understood that the angle between the hinged extensions and the reel-arms associated therewith becomes more obtuse until the said hinged extensions move into a more or less vertical position, when the weight thereof will move the supporting-arms J and the extension 13 inward thus moving the rollers L out of contact with the perimeter of the cam A, and cause the rollers M to operate against the inner side of the cam-track N. The function of the cam-track N is to prevent the hinged extensions of the reel from falling inward too far at certain times.

Hinged by the bolt 140 to the lower end of the cam-track N, is a curved lip 14, which is in reality a continuation of the cam-track N. When the parts are in the position shown in Fig. 1, the curved lip 14 occupies the position shown in this figure and in Fig. 4.
Now although I have designed my reel to be used in connection with raising fallen grain as before set forth, it will be understood from the following part of my specification, that my reel can be used in connection with erect grain. As a rule, the percentage of fallen or lodged grain in a field, to that of the upright or erect grain, is comparatively small, and my binder-reel is so constructed that, at the will of the operator, it can be positioned so as to operate upon fallen or lodged grain and upright or erect grain. Should the operator be cutting erect grain, he would throw the curved lip 14 into the position shown in Fig. 2 (by the means hereinafter described), close to the cam member A, thus causing the rollers L and M, as they come in contact with the said curved lip 14, to be deflected in their path of movement and pass outside of the cam-track N, around which they operate. This deflecting the path of movement of the said roller causes the outer ends of the supporting-arms J to be forced inward into the space between the ring plate H and the cam-track N, thus throwing the rock-bars I; rods 11 and 12 and the hinged extensions of the reel into the position shown in Fig. 2, in which position the said hinged members are held by means hereinafter described. It will now be understood that the reel as illustrated in Fig. 2 is in position so that the cross-bars F thereof will feed the erect grain to the cutter-bar.

By means hereinafter described, should the operator be approaching a body of lodged or fallen grain, the curved lip 14 will be moved into the position shown in Figs. 1 and 4 thus, (after certain locking means for the hinged extensions have been unlocked,) causing the wheels L and M to take up the path of movement between the cam-track N and the cam A and so position the hinged extensions that they will perform their function.

Upon referring particularly to Fig. 4 it will be seen that there is a gap between the end 16 of the cam-track N and the free end of the curved lip 14. Now it is by means of this gap, together with the hinged curved lip, whereby the path of movement of the rollers L and M is deflected. When the curved lip 14 is moved toward the cam A, it will be understood that its free end constricts the lower end of the said gap to such an extent as to compel the rollers as they escape the end 16 of the cam-track N to pass below said curved lip.

17 is a wire hoop held by eyelets 18 to the reel-arms E adjacent to the head of the reel. 19 are a plurality of latch rods twisted to form an eye 20 through which passes a bolt 21 pivoting them to said reel-arms. The extensions 22 of said latch-rods pass through eyes 23 twisted in the hoop 17, and have their lower ends provided with an off set end 24 which prevents them from being drawn out of the eyes 23. Before the curved lip 14 is thrown inward, the wire hoop 17 is shifted by hand in the direction indicated by arrow. When this wire hoop has been moved a certain distance, the eye 23 thereof abuts the ends 24 of the latch-rods 19, thus throwing these latch-rods around their bolts 21 into the position shown in Fig. 2, thus positioning the heads 25 of said latch-rods so that as the supporting-arms J are moved into position shown in Fig. 2, the cross-bars e of the hinged extension will be pulled over the heads 25 and thus latched into position. Through the construction of the latch-rods 19 and the hoop 17, it will be understood that the said hinged extension will be more or less held in their locked position under spring tension. Of course when the operator is approaching a body of lodged or fallen grain, the hoop 17 must be shifted in the direction opposite to that indicated by arrow. This movement will throw the heads 25 of the latch-rods 19 out of the path of movement of the cross-bars e, thus allowing the hinged extensions freedom to assume their operative position in due course.

The heads 25 of the latch-rods 19 are provided with tapered front edges 26 which, by means of the bent portion 27 which butts against the body of the latch-rods, are maintained in the shape shown. The backward tapered front edges of the heads 25, together with the elasticity in the latch-rods themselves, facilitates the passing of the cross-bars e over said heads: and when the said cross-bars have escaped said heads the elasticity in the said latch-rods forces the said heads positively against the under side of the said cross-bars. By reason of the manner in which the latch-rods 19 are supported, it will be understood that they have no material lateral movement to cause the cross-bars e to be prematurely disengaged therefrom.

Secured to, or formed a part of, the curved lip 14, is a lever arm 28. Mounted in the upper ends of the straps 10, is a rock-bar 29, the inner end 30 of which is bent upward and provided with a head 31 which operates in the longitudinal slot 32 formed in the lever arm 28, the outer end 33 of the rock-bar 29 is positioned as shown, and coupled therewith is a rod 34 which extends into convenient position to the operator's seat, (not shown). By means of the rod 34 and the construction just described, it will be understood that the position of the curved lip 14 can be altered at will.

While I have described what I consider to be the best embodiment of my invention, I desire it to be understood that the principles can be embodied in different forms, and I desire not to be limited beyond the requirements of the prior art and the terms of my claims.

What I claim as my invention is:

1. In a binder-reel, the combination with the reel-arms therefor; the reel shaft on which said reel-arms are mounted, and means for operating said reel, of extensions hinged to said reel-arms; a cross-bar carried by each of said extensions a stationary cam mounted on said shaft, a plurality of supporting-arms pivoted to said reel; a pair of rollers of different diameters, mounted in the inner ends of said supporting-arms; a cam-track carried by said cam and overhanging the periphery of the same, and means intermediate said supporting-arms and said hinged extensions whereby, as the said reel rotates and the smaller rollers carried by said supporting-arms follow a certain part of the periphery of said cam, the said hinged extensions will be operated to pass under and raise up the lodged or fallen grain, means for causing said rollers to move out of contact with said cam thereby throwing the said hinged extensions out of gear, a hoop carried by said reel-arms at one end of said reel, and latch-rods hinged to the said reel-arms and connected with said hoop so that as the hoop is shifted, the said latch-rods will be positioned so that when the said hinged-extensions are out of gear, the cross-bars thereof will slip down over the heads of said latch-rods and thereby be locked in this position.

2. In a binder-reel the combination with the reel-arms therefor grouped in pairs, cross-bars carried by said reel-arms; the reel shaft on which said reel-arms are mounted, and means for operating said shaft, of extensions hinged to the cross-bars carried by said reel-arms, and each provided with a cross-bar; a ring plate carried by the reel-arms at the head and tail end of the reel spindle; a stationary cam mounted on said shaft; a plurality of rock-bars mounted in the said ring plates; supporting-arms keyed to the outer ends of said rock-bars; a pair of rollers of different diameters, mounted in the inner ends of said supporting-arms; a cam track carried by said cam and overhanging the periphery of the same, rods connecting said supporting-arms and said rock-bars with the said hinged extensions, whereby as the said reel rotates and the smaller rollers carried by said supporting-arms follow a certain part of the periphery of said cam, the said hinged extensions will be operated to pass under and raise up the lodged or fallen grain, a hoop carried by said reel-arms at one end of said reel, and latch-rods hinged to the said reel-arms and connected with said hoop so that as the hoop is shifted the said latch-rods will be positioned so that when the said hinged extensions are out of gear, the cross-bars thereof will slip down over the heads of said latch-rods and thereby be locked in this position.

3. In a binder-reel, the combination with the reel-arms therefor grouped in pairs; cross bars carried by said reel-arms; the reel shaft on which said reel arms are mounted, and means for operating said shaft, of extensions hinged to the cross-bars carried by said reel-arms, and each provided with a cross-bar; a stationary cam mounted on said shaft; means pivoted to said reel-arms and coacting with said stationary cam and the said hinged extensions whereby as the reel rotates, the said hinged extensions are operated to raise lodged or fallen grain; means for throwing said intermediate means out of gear thereby throwing said hinged extensions out of operative position; a hoop carried by the reel-arms at one end of the said reel, and latch-rods hinged to the said reel-arms and connected with said hoop, so that as the hoop is shifted, the said latch rods will be positioned so that when the said hinged extensions are out of gear, the cross-bars thereof will slip down over the heads of said latch-rods and thereby be locked in this position.

In testimony whereof I have affixed my signature in presence of two witnesses.

ENOCH SEIBERT.

Witnesses:
  JOHN M. SLOUGH,
  W. J. MARSDEN.